(12) United States Patent
Harrison (10) Patent No.: US 7,547,980 B2
(45) Date of Patent: Jun. 16, 2009

(54) POWER GENERATING UNIT ON SEMI-TRAILER FOR ENERGY RECOVERY AND STORAGE

(76) Inventor: Roger Harrison, 28045 Academy, Roseville, MI (US) 48066

( * ) Notice: Subject to any disclaimer, the term of this patent is extended or adjusted under 35 U.S.C. 154(b) by 234 days.

(21) Appl. No.: 11/673,333

(22) Filed: Feb. 9, 2007

(65) Prior Publication Data

US 2007/0187957 A1    Aug. 16, 2007

Related U.S. Application Data

(60) Provisional application No. 60/771,966, filed on Feb. 10, 2006.

(51) Int. Cl.
*F02B 63/04* (2006.01)
(52) U.S. Cl. .................................... 290/1 R
(58) Field of Classification Search ............... 290/1 R, 290/1 A, 4 R, 1 B; 123/2; 180/2.2, 65.3, 180/65.1, 165; 280/423.1; 322/1
See application file for complete search history.

(56) References Cited

U.S. PATENT DOCUMENTS

| | | | | | |
|---|---|---|---|---|---|
| 704,573 | A | * | 7/1902 | Pintsch | 322/12 |
| 1,766,163 | A | * | 6/1930 | Vukosav | 180/14.1 |
| 2,159,885 | A | * | 5/1939 | Cullin | 322/1 |
| 3,182,742 | A | * | 5/1965 | Dow | 180/14.1 |
| 3,972,380 | A | * | 8/1976 | Hudson et al. | 180/65.3 |
| 4,165,466 | A | * | 8/1979 | Stikkers | 290/3 |
| 4,314,160 | A | * | 2/1982 | Boodman et al. | 290/55 |
| 4,657,289 | A | * | 4/1987 | Boyer | 290/1 R |
| 5,178,403 | A | | 1/1993 | Kemner et al. | |
| 5,680,907 | A | * | 10/1997 | Weihe | 180/2.2 |
| 5,767,663 | A | | 6/1998 | Lu | |
| 5,921,334 | A | * | 7/1999 | Al-Dokhi | 180/2.2 |
| 6,390,215 | B1 | | 5/2002 | Kodama et al. | |
| 2004/0012205 | A1 | * | 1/2004 | Sua-An | 290/40 C |
| 2007/0261902 | A1 | * | 11/2007 | Margoudakis | 180/65.3 |

FOREIGN PATENT DOCUMENTS

GB    2101813 A  *  1/1983

* cited by examiner

*Primary Examiner*—Julio C. Gonzalez
(74) *Attorney, Agent, or Firm*—Harness, Dickey & Pierce, P.L.C.

(57) ABSTRACT

The present disclosure is directed to a power generating unit secured beneath a semi-trailer on an over-the-road vehicle. The power generating unit is selectively positionable from a raised position to a lowered position wherein a generating wheel is in contact with the road surface for recovering brake torque potential energy during select operational states of the vehicle. A storage battery is carried on the vehicle trailer and in electrical communication with the generator to store such excess electrical energy. Periodically, the electrical energy is made available for discharging to a stationary storage battery for sale and distribution into the power grid as supplemental energy or alternately to provide a temporary power substation.

18 Claims, 6 Drawing Sheets

POWER GENERATING UNIT ON SEMI-TRAILER FOR ENERGY RECOVERY AND STORAGE

CROSS-REFERENCE TO RELATED APPLICATIONS

This application claims the benefit of U.S. Provisional Application No. 60/771,966, filed on Feb. 10, 2006. The disclosure of the above application is incorporated herein by reference.

FIELD

The present disclosure relates to reclamation of wasted energy in a vehicular application, and in particular to the recovery and storage of energy in form of braking torque potential energy resulting from the deceleration of a vehicle which may be subsequently provided to a stationary storage source or distributed into a power grid or used as a secondary power source for emergency backup applications.

BACKGROUND

The statements in this section merely provide background information related to the present disclosure which may not constitute prior art.

Land-based vehicles, e.g., over-the-road (OTR) vehicles such as tractor semi-trailer rigs, represent an abundant resource of potential energy that is presently not being recovered. Specifically, in the course of travel, the deceleration of such vehicles is accomplished by a frictional load imposed on the power train either by a braking system or through back driving the transmission and engine of the vehicle. Thus, the energy utilized to decelerate the vehicle is either lost through heat dissipation or through non-productive operation of the vehicle's motor.

The opportunity for energy recovery becomes significant when one considers the number of OTR vehicles which travel the roads of the United States in a given day. With the multitude of trucks traveling the interstates to transport goods to various destinations, a significant source of energy recovery could be provided by a power generating system which efficiently and effectively recovers and stores this otherwise lost energy. Accordingly, there is a need in the art to provide a useable power generating system for land-based vehicles such as an OTR vehicle for recovery and storage of potential energy.

SUMMARY

An energy recovery and storage system is described herein which is readily adaptable to land-based vehicles and in particular OTR vehicles. In addition, a method or sequence of operations is provided which permits the efficient recovery and storage of brake torque energy without adversely effecting the operation of the vehicle in other modes of operation. Such a power generating system includes a power generating unit adapted to be secured to the undercarriage of a vehicle. The power generating unit includes a wheel which is positionable to selectively contact the road surface based on the operational state of the vehicle. The generator wheel is rotatably coupled to a generator or alternator which converts the rotational energy from the wheel into electrical energy. Alternately, the power generating unit includes a wheel which is continuously in contact with the road surface, and selectively coupled to the generator or alternator through a clutch mechanism. The power generating unit is electrically coupled to a storage battery carried onboard the vehicle for storage of the recovered electrical energy. The vehicle may further be equipped with a solar cell array as an auxiliary power recovery source which may also be coupled to the battery array for further storage of electrical energy (i.e., trickle charge battery).

When the vehicle has reached its destination, the energy stored in the battery may be electrically coupled to a stationary storage device such as a stationary battery array. As such, the electrical energy from the on-board storage battery array is discharged into the stationary battery array or connected to a stationary generator where it becomes usable at that local site. The stationary storage battery may also be electrically coupled to a power grid where the energy may be sold and discharged into the power grid. Alternately, the electrical energy in the stationary storage battery may be used to operate circuits or equipment at the discharge site. In the event of poor grid failure, multiple trailers could be coupled together to provide a safe reliable emergency source of electrical energy from the on-board storage array to support the discharge location allowing it to remain operating until power is restored. Large distribution centers where hundreds of trailers are located could supply enough energy to become a utility substation.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
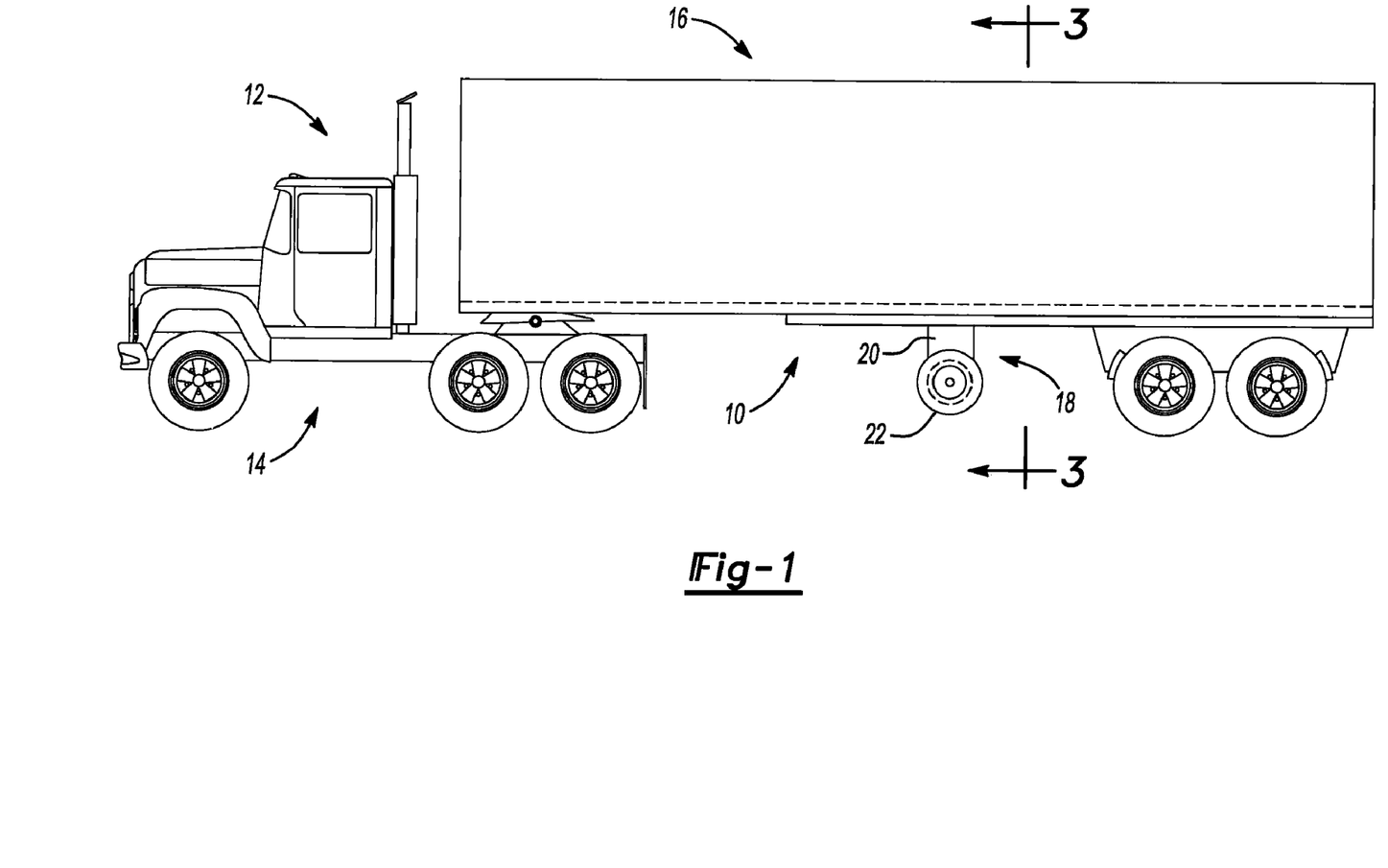
FIG. 1 illustrates a tractor semi-trailer rig with a power generating system.
Figure 4:
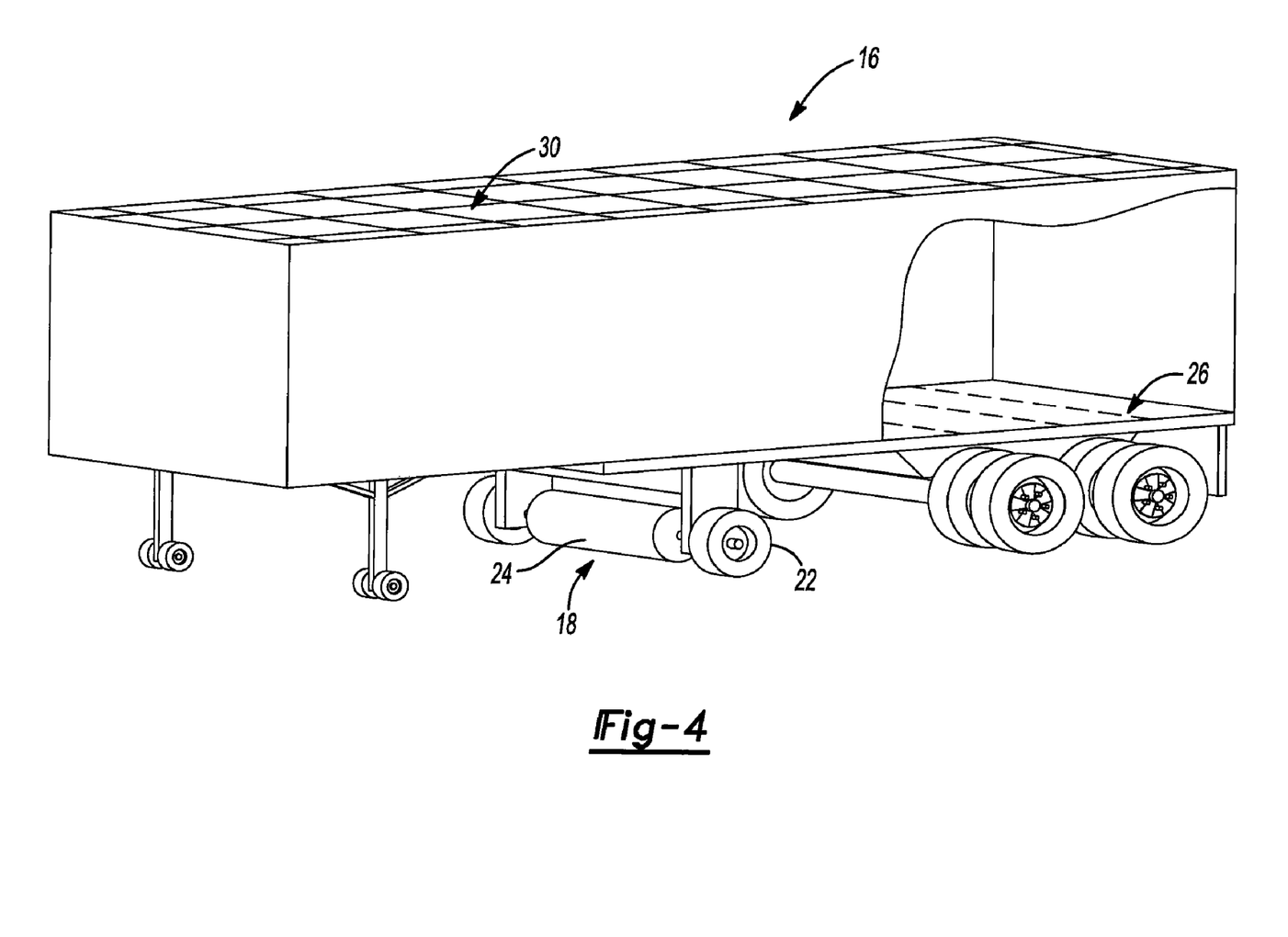
FIG. 4 is an isometric view of the semi-trailer illustrating the various components of the power generating system.

As described herein a power generating system 10 is provided on and over-the-road (OTR) vehicle 12 which includes a tractor 14 and a semi-trailer 16. The power generating system 10 includes a power generating unit 18 coupled to the bottom of semi-trailer 16 by a support 20. The power generating unit 18 includes a generator wheel 22 rotatably coupled to a power generator 24. The power generator may take the form of a generator, an alternator or other means for converting rotational motion to electrical energy. A storage battery 26 is carried onboard the semi-trailer 16 preferably in the form of a battery array located within the floor 28 of the semi-trailer 16. The storage battery 26 is electrically coupled to the generator 24. The power generating system 10 may optionally include other means for generating electrical energy. In this regard, a solar panel array 30 may be located on the roof 32 of the semi-trailer 16. The solar panel array 30 is electrically coupled to the storage battery 26 such that additional electrical energy generated by the solar panel array 30 is stored in the storage battery 26. The potential for, additional energy for, charging could be derived from an oversized alternator mounted on engine of tractor.

Figure 3:
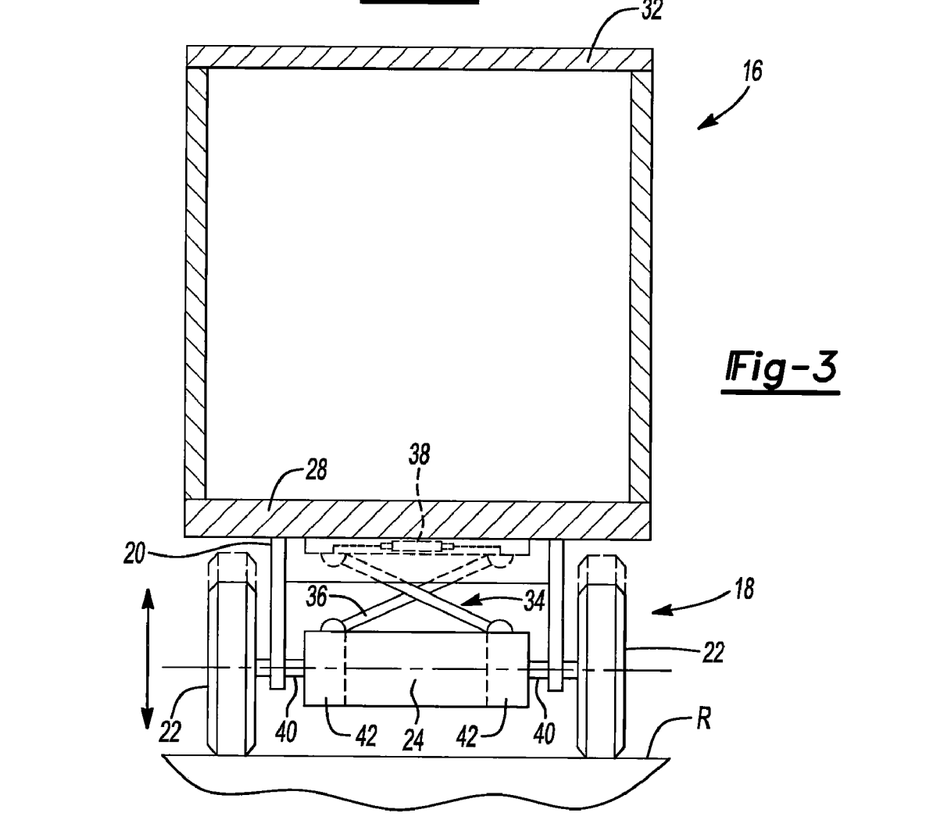
FIG. 3 is a cross-section taken along line III-III as shown in FIG. 1.

As previously described, the power generating unit 18 is supported beneath the semi-trailer 16 by support 20. As best seen in FIG. 3, support 20 is provided with an actuator operable to selectively activate the power generator 24. In one embodiment, the actuator includes a mechanism 34 which is operable to vertically position the power generating unit 18 from a lowered position (shown in solid lines) wherein the generator wheels 22 contact the road surface R to a raised position (shown in phantom lines) wherein the generator wheels 22 is positioned out of contact from road surface R. In another embodiment, the actuator includes a clutch mechanism 42 which is operable to couple the generator wheel 22 with the power generator 24. One skilled in the art will recognize that these embodiments of the actuator may be used alone or in combination.

The mechanism 34, as illustrated in FIG. 3, is a linkage mechanism having a pair of links 36 extending between the support 20 and the generating unit 24 and an actuator 38 operably coupled to linkages 36 for selectively positioning the power generating unit 18. While mechanism 34 has been shown and described as an actuated linkage mechanism, it should be appreciated that other suitable means for vertically positioning the power generator 24 may be employed. In this regard, the mechanism 34 must be suitable to vertically position the power generating unit 18 to place the generator wheels 22 into contact with the road surface R and maintain such contact.

The power generating system 10 as described above is operable in the following manner. In the course of driving, the engine (not shown) of OTR vehicle 12 drives the vehicle along road surface R during the majority of the travel time, the brake torque potential energy is minimal since the motor is driving the vehicle 12. In such circumstances, the power generating unit 18 is de-activated. For example, the power generator 24 is vertically positioned in a raised position (as shown in FIG. 1 and as shown in phantom lines in FIGS. 2 and 3). In the raised position the generator wheels 22 of the power generating unit 18 are out of contact from the road surface R, and thus the power generating system 10 is in an idle mode of operation. Alternately, the clutch mechanism 42 is engaged such that rotational motion of the generator wheel 22 is uncoupled from the power generator 24.

Figure 2:
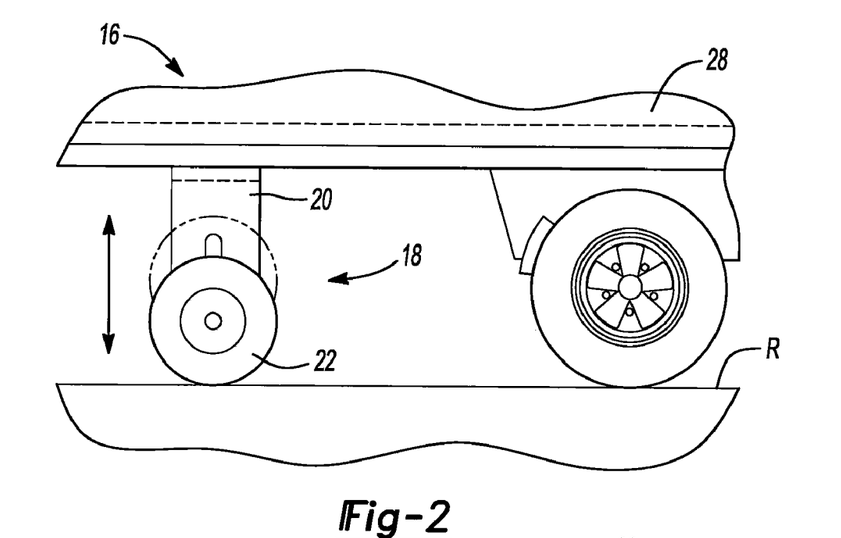
FIG. 2 is a detailed view showing the power generating unit secured to the semi-trailer positionable between a raised idle position and a lowered activated position.

When an opportunity to recover brake torque potential energy occurs, mechanism 34 is actuated. For example, the power generator 24 is lowered vertically downward such that the generator wheels 22 come into contact with the road surface R. Such contact between the generator wheels 22 and the road surface R causes the generator wheel 22 to rotate. As a result, the generator shaft 40 which is coupled to the generator wheels 22 rotates, thereby generating electrical energy. The electrical energy reclaimed from the power generating unit 18 is directed into the storage battery 26 where it is stored for subsequent use. Alternately, the clutch mechanism 42 is disengaged such that rotational motion of the generator wheel 22 is coupled to the power generator 24.

As noted above, the power generator 24 is operable based upon the opportunity to recover brake torque potential energy. Three such opportunities to recover such brake torque in the normal course of operation of a vehicle such as OTR vehicle 12 are generally known. These opportunities include (1) during deceleration of the vehicle such as when a braking system is applied in a conventional vehicle; (2) during downhill travel of the vehicle such as when a lower gear of the transmission might be utilized to back drive the motor in mountainness terrain; and (3) during stopping maneuvers when the vehicle is brought to a complete rest. Other opportunities to recover such brake torquing potential energy may be identified and available during the normal operation of OTR vehicle 12.

Figure 5:
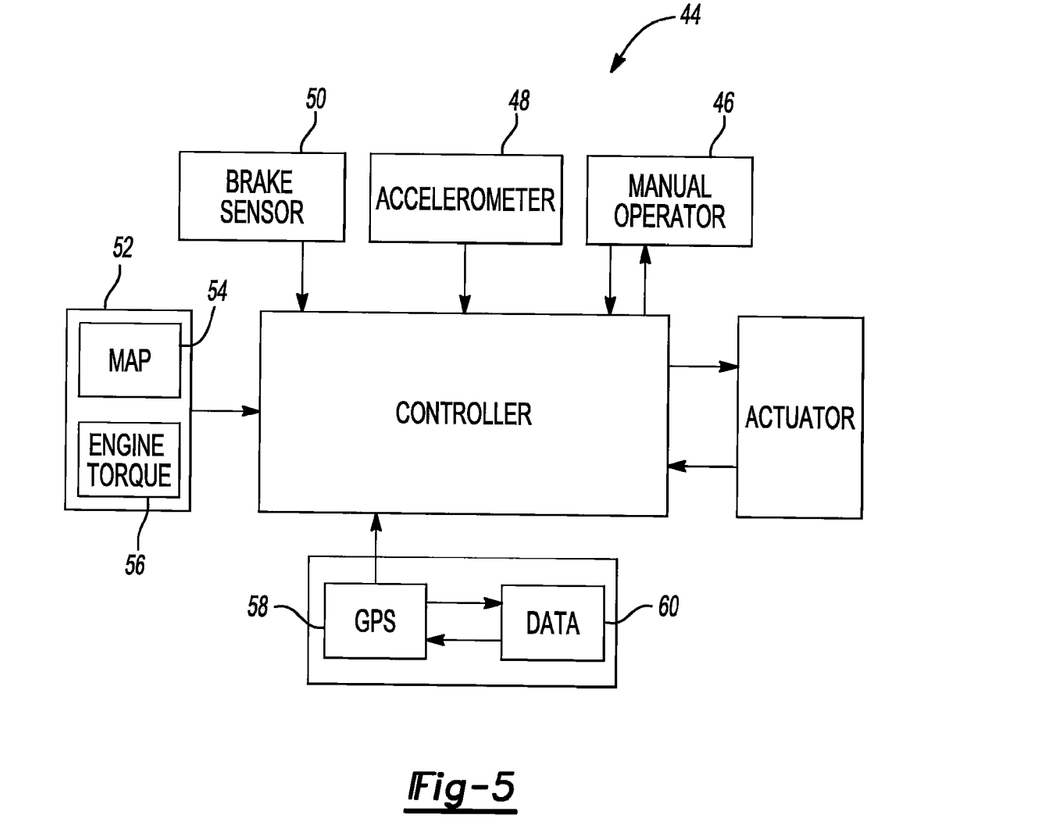
FIG. 5 is a schematic illustrating a controller incorporated into the power generating system.
Figure 6A:
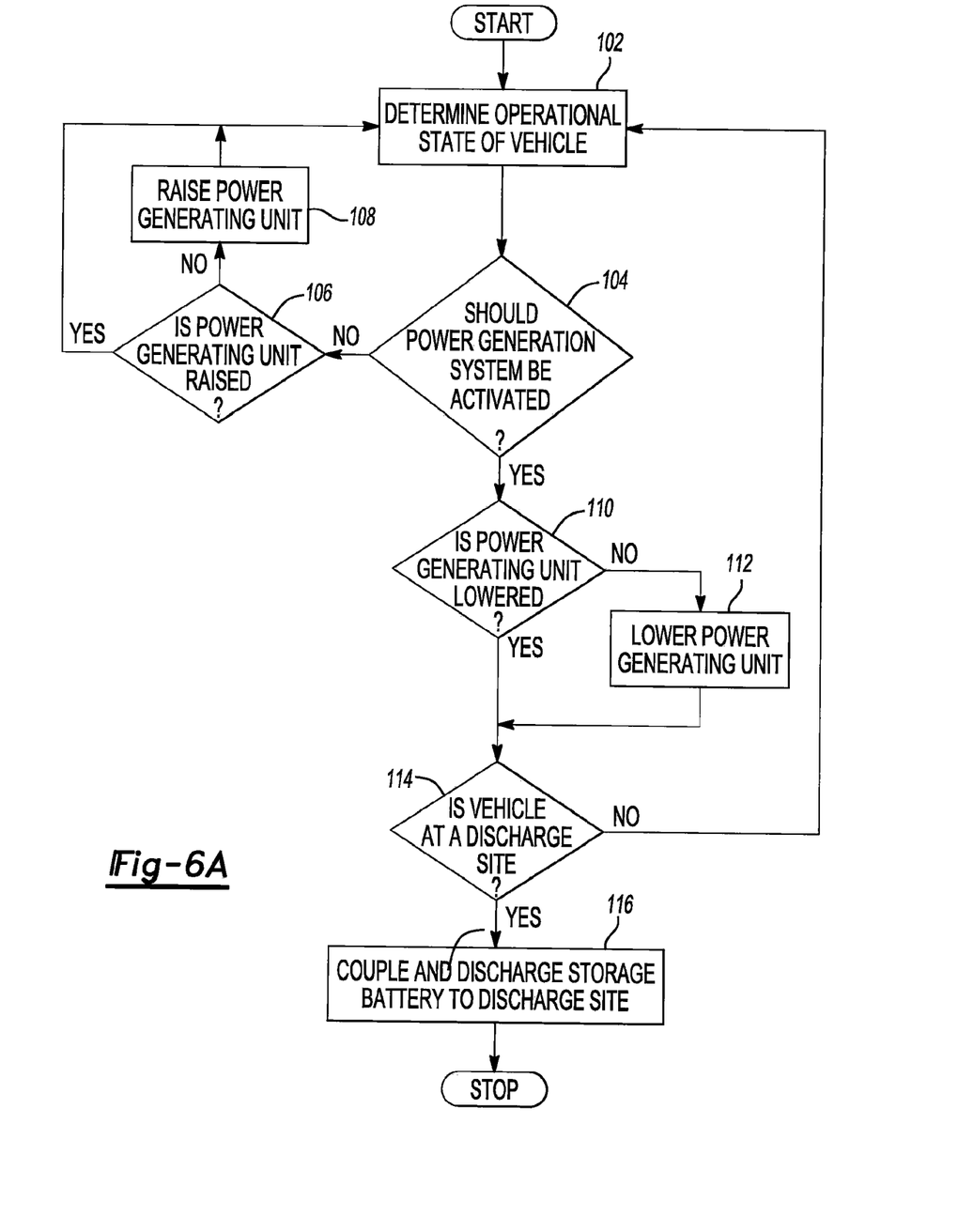
FIG. 6a is a flowchart illustrating the method employed by the power generating system to recover and store electrical energy.
Figure 6B:
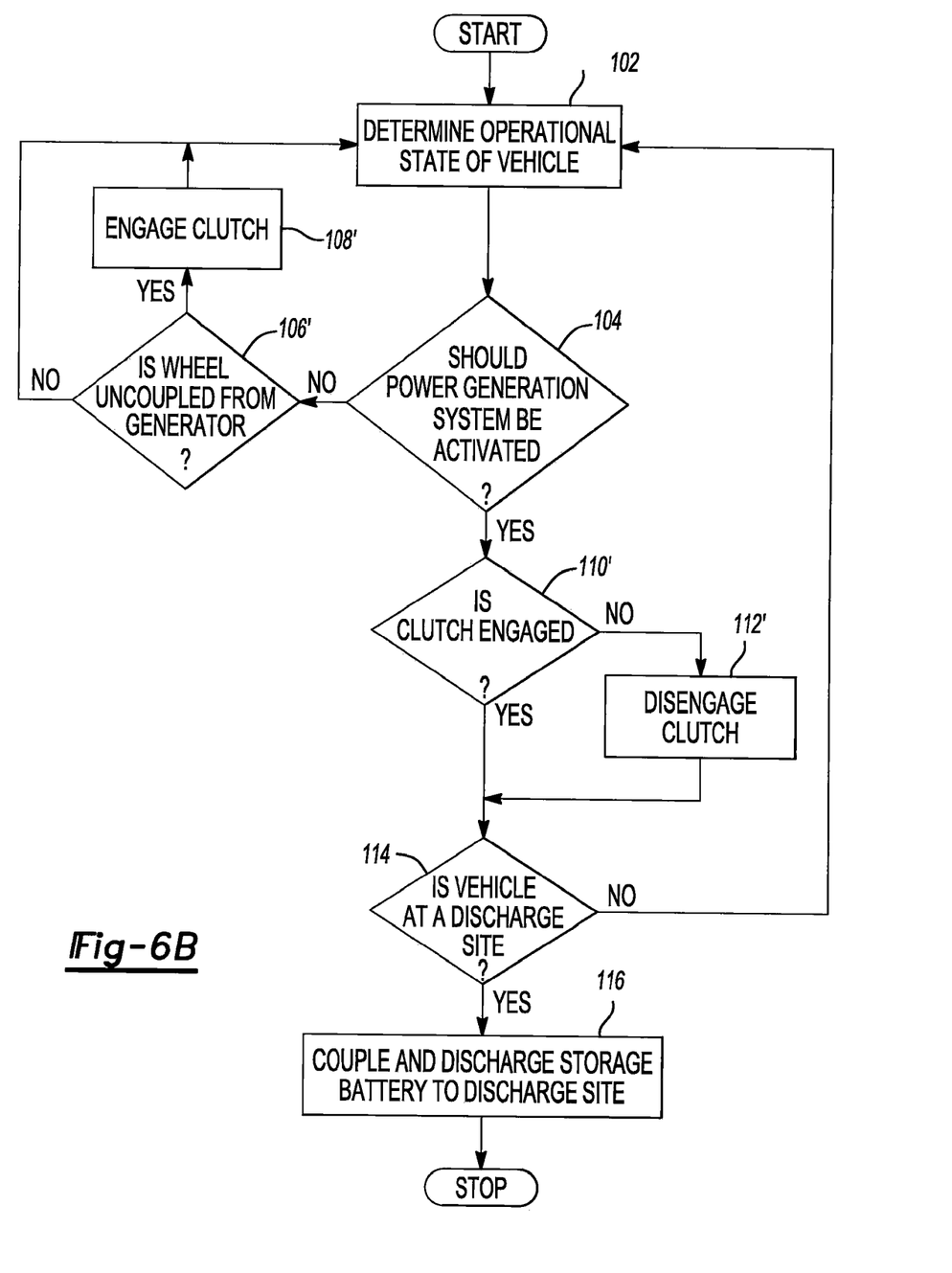
FIG. 6b is a flowchart illustrating an alternate method employed by the power generating system to recover and store electrical energy.

As will be appreciated from the above description and illustrated in FIG. 5, the actuation of power generating system 10 may be controlled by control circuit 44 based upon the operational state of the vehicle, (e.g., accelerating, decelerating, steady state) or based upon the terrain over which the vehicle is traveling (e.g., flat roads, up hill or downhill). In its simplest form, the opportunity to recover brake torque potential energy may be evaluated by the operator of the vehicle 46, who in turn would manually actuate the mechanism 34 to activate the power generating system 10. Alternately, activation of the power generating system 10 may be automated by the control circuit 44 based upon input signals from various sources. For example, an accelerometer 48 could be utilized in conjunction with the power generating unit 18 to evaluate the current state of acceleration/deceleration of the vehicle. If the rate of deceleration is above a predetermined value, the actuators in the form of the position mechanism 34 and/or the clutch mechanism 42 could be actuated to bring the power generator 24 into its operational position. Alternately, certain sensors currently located onboard the OTR vehicle 12 could be employed to determine the operational state of the vehicle. For example, if the vehicle 12 is equipped with brake sensors 50, the actuators may be controlled in a manner such that the power generator 24 is activated when a predetermined braking state or condition exists. Alternately, certain engine control sensors 52 such as the manifold absolute pressure (MAP) sensor 54 or an engine torque sensor 50 could be employed to evaluate the operational state of the motor such that the power generator 24 is activated when a predetermined condition or state of operation of the motor (for example when the motor is being back driven) exists.

Control of the power generating system 10 may also be implemented in a predictive manner. For example, the OTR vehicle 12 may be provided with a global positioning system (GPS) 58 to provide absolute global positioning data for the vehicle 12. In addition, topological data 60 regarding the terrain over which the vehicle will travel in route to its destination may be provided such that the power generation system 10 may be controlled in response thereto. Specifically, with the global positioning system 58 and the topological data 60, the power generating unit 18 can be activated when the control system predicts that the vehicle 12 will be traveling in a downhill direction. Predetermined set points may be provided which ensure that the power generation system 10 is only operated when the vehicle 12 is traveling down a road having a grade greater than a predetermined value. In any of the above given automated control sequences, it is anticipated that the vehicle operator could override such automated control.

Further details concerning the power generation system 10 become apparent upon consideration of how the system is implemented. For example, one benefit of the present invention is that it may be readily adapted to current semi-trailer applications. Specifically, the power generating unit 18 and in particular the support 20 may be designed so as to be easily retrofit onto existing semi-trailers. This further has the advantage of providing an efficient means for maintaining and servicing the power generating unit. Specifically, such units may be secured to the bottom of the semi-trailers with bolts or some more threaded fasteners such that it may be readily removed for maintenance repair. Likewise, the location of the power generating unit 18 may be appropriately positioned beneath the semi-trailer 16 as a function of the load distribution within the trailer.

What is claimed is:

1. A power generating unit for an over-the-road vehicle comprising:
   a support capable of being secured beneath a semi-trailer;
   a power generator carried by said support and having a generator wheel rotatably coupled to said power generator;
   an actuator operable to selectively activate said power generator for converting rotational motion of said generator wheel to electrical energy, said actuator including a clutch mechanism selectively coupling said generator wheel and said power generator, and operable in an engaged state to uncouple said generator wheel and said power generator and a disengaged state to couple said generator wheel and said power generator; and
   a storage battery electrically coupled to said power generator for storing said electrical energy.

2. The power generating unit of claim 1 wherein said actuator comprises a positioning mechanism interposed between said support and said power generator, said positioning mechanism movable between a retracted position such that the generator wheel is proximate to said support and an extended position such that the generator wheel is remote from said support.

3. The power generating unit of claim 2 wherein said actuator further comprises a linkage connecting said support and said power generator and a drive unit for positioning said power generator between said retracted position and said extended position.

4. The power generating unit of claim 1 wherein said actuator comprises a solar panel capable of being secured on top of a semi-trailer for generating electrical energy from solar energy, said solar panel electrically coupled to said storage battery for storing said electrical energy generated by said solar panel.

5. The power generating unit of claim 4 wherein said storage battery is an on-board storage battery and a trickle charge is used to store said electrical energy in said on-board storage battery.

6. The power generating unit of claim 1 wherein said storage battery is an on-board storage battery and is further electrically coupled to at least one device selected from the group consisting of a stationary storage battery, a stationary generator, another over-the-road vehicle, and a power grid.

7. A power generating unit for an over-the-road vehicle comprising:
   a support capable of being secured beneath a semi-trailer;
   a power generator carried by said support and having a generator wheel rotatably coupled to said power generator;
   an actuator operable to selectively activate said power generator for converting rotational motion of said generator wheel to electrical energy;
   a storage battery electrically coupled to said power generator for storing said electrical energy; and
   a controller generating a control signal in response to an operational state and transmitting said control signal to said actuator for positioning said power generator in one of said retracted position and said extended position.

8. The power generating unit of claim 7 wherein said operational state is determined from at least one sensor selected from the group consisting of an accelerometer, a brake sensor, a manifold pressure sensor, an engine torque sensor and a global positioning system.

9. The power generating unit of claim 7 wherein said operational state is determined by a manual operator.

10. An over-the-road vehicle comprising:
    a tractor and semi-trailer combination;
    a support beneath said semi-trailer;
    a power generator carried by said support and having a generator wheel rotatably coupled to said power generator;
    an actuator operable to selectively activate said power generator for converting rotational motion of said generator wheel to electrical energy, said actuator including a clutch mechanism selectively coupling said generator wheel and said power generator operable in an engaged state to uncouple said generator wheel and said power generator and a disengaged state to couple said generator wheel and said power generator; and
    a storage battery carried in said semi-trailer and electrically coupled to said power generator for storing said electrical energy.

11. The power generating unit of claim 10 wherein said actuator comprises a positioning mechanism interposed between said support and said power generator, said positioning mechanism movable between a retracted position such that the generator wheel is proximate to said support and an extended position such that the generator wheel is remote from said support.

12. The power generating unit of claim 11 wherein said actuator further comprises a linkage connecting said support and said power generator and a drive unit for positioning said power generator between said retracted position and said extended position.

13. The power generating unit of claim 10 wherein said actuator comprises a solar panel secured on top of said semi-trailer for generating electrical energy from solar energy, said solar panel electrically coupled to said storage battery for storing said electrical energy generated by said solar panel.

14. The power generating unit of claim 13 wherein said storage battery is an on-board storage battery and a trickle charge is used to store said electrical energy in said on-board storage battery.

15. The power generating unit of claim 10 wherein said storage battery is an on-board storage battery and is further electrically coupled to at least one device selected from the group consisting of a stationary storage battery, a stationary generator, another over-the-road vehicle, and a power grid.

16. An over-the-road vehicle comprising:
    a tractor and semi-trailer combination;
    a support beneath said semi-trailer;
    a power generator carried by said support and having a generator wheel rotatably coupled to said power generator;
    an actuator operable to selectively activate said power generator for converting rotational motion of said generator wheel to electrical energy;
    a storage battery carried in said semi-trailer and electrically coupled to said power generator for storing said electrical energy; and a controller generating a control signal in response to an operational state and transmitting said control signal to said actuator for positioning said power generator in one of said retracted position and said extended position.

17. The power generating unit of claim 16 wherein said operational state is determined from at least one sensor selected from the group consisting of an accelerometer, a brake sensor, a manifold pressure sensor, an engine torque sensor and a global positioning system.

18. The power generating unit of claim 17 wherein said operational state is determined by a manual operator.

* * * * *